No. 606,914. Patented July 5, 1898.
J. W. BRAGGER.
CLAMP FOR BALL AND SOCKET JOINTS.
(Application filed Oct. 18, 1897.)
(No Model.)
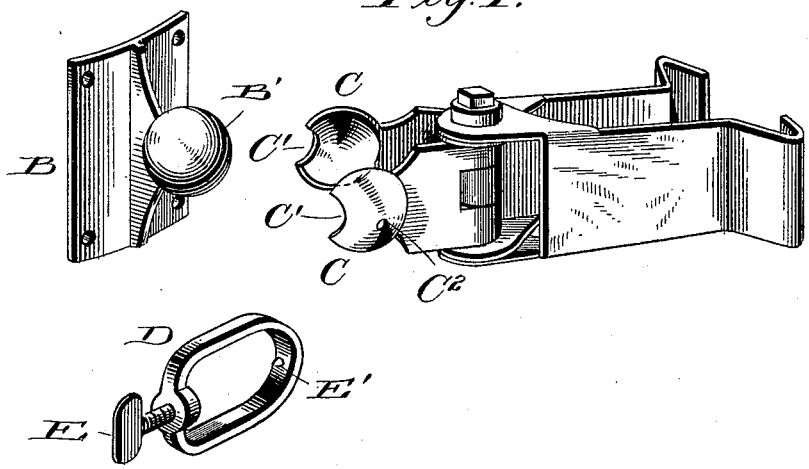
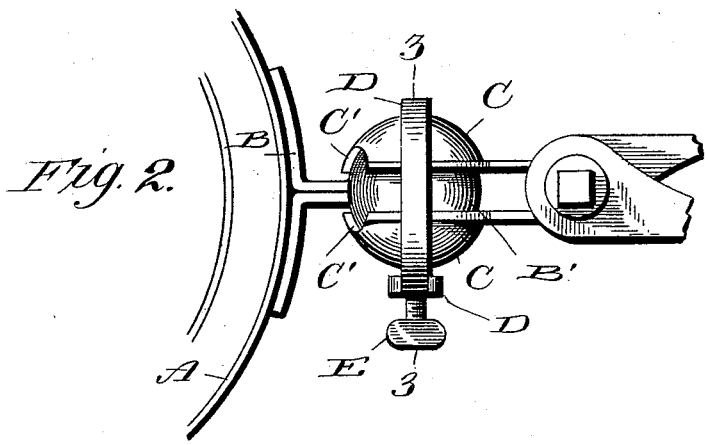
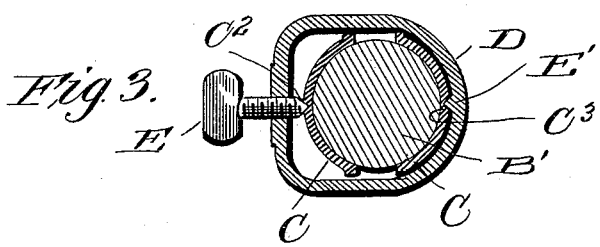
Witnesses
L. C. Hills.
J. M. Pfiffer.
Inventor
John W. Bragger,
by Franklin W. Hough
Attorney

United States Patent Office.

JOHN W. BRAGGER, OF WATERTOWN, NEW YORK, ASSIGNOR TO THE HITCHCOCK LAMP COMPANY, OF SAME PLACE.

CLAMP FOR BALL-AND-SOCKET JOINTS.

SPECIFICATION forming part of Letters Patent No. 606,914, dated July 5, 1898.

Application filed October 18, 1897. Serial No. 655,620. (No model.)

*To all whom it may concern:*

Be it known that I, JOHN W. BRAGGER, a citizen of the United States, residing at Watertown, in the county of Jefferson and State of New York, have invented certain new and useful Improvements in Clamps for Ball-and-Socket Joints; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in means for holding securely in any position the parts forming a ball-and-socket joint, and especially to a clamp which is adapted to hold the cup-sections of the joint securely bound against the ball which is held within the socket.

More specifically the invention resides in the provision of an attachment especially designed for use in connection with bicycle-lanterns, whereby the lantern proper may be held at an angle by means of a ball-and-socket joint having secured about the same a clamping member which is held centrally to the cups in which the ball operates, means being provided to allow the lantern to be moved in any direction without interference with the cups of the ball-and-socket joint.

To these ends and to such others as the invention may pertain the same consists, further, in the novel construction, combination, and adaptation of parts, as will be hereinafter more fully described, and then specifically defined in the appended claim.

The invention is clearly illustrated in the accompanying drawings, which, with the letters of reference marked thereon, form a part of this application, and in which—

Figure 1 is a perspective view of the clamp, ball-and-socket joint, and jaws, showing the parts dissembled. Fig. 2 is a top plan view of the parts connected together. Fig. 3 is a cross-sectional view on line 3 3 of Fig. 2.

Reference now being had to the details of the drawings by letter, A designates the shell of the lantern, to which is secured a bracket B, which has integral therewith the ball B', which forms a part of the ball-and-socket joint. The other members forming the said joint are composed of the two cups C, of similar construction and forming at their rear ends the tubular part of the hinge, to which the bracket members are pivoted. The forward margins of said cups are cut away, as shown at C', so as not to allow the said cups to interfere with the bracket member B when it is desired to turn the shell of the lantern in different positions.

In order to hold the members of the ball-and-socket joint in a fixed position, a clamp D is provided, which is made, preferably, of a single strip of metal, which encircles the sockets containing the ball, and in said clamp or strap is an adjusting thumb-screw E, which is fitted in a screw-threaded aperture in said clamp and has its end tapering to a point for engagement in an aperture $C^2$ in one side of one of two socket-cups. At the upper portion of the said clamp on its inner side is a lug E', which is adapted to engage in an aperture $C^3$, centrally formed in the outer surface of the upper of the two cups.

The manner of clamping and holding the lantern in any desired position will be readily understood, as by adjusting the clamping member over the sockets of the ball-and-socket joint and tightening the thumb-screw the clamp will cause the two sockets to bind tightly against the ball, and thus securely hold the parts in a fixed position, and by scalloping out or cutting away the cups, as illustrated, the shell may be adjusted laterally without any interference, as will be readily understood.

Having thus described my invention, what I claim to be new, and desire to secure by Letters Patent, is—

In combination with the casing of the lantern having a ball-bracket secured thereto, the cups C scalloped out as at C', the clamp D, one end of which conforms to the curve of the cups, and having a lug E' adapted to engage in a depression in the convex surface of one of the cups, and the pointed thumb-screw carried by the clamp and designed to engage in a depression in the second cup, as shown and described.

In testimony whereof I affix my signature in presence of two witnesses.

JOHN W. BRAGGER.

Witnesses:
 I. J. MORRIS,
 CORA L. SHERMAN.